(12) United States Patent
Collins et al.

(10) Patent No.: US 9,069,877 B2
(45) Date of Patent: Jun. 30, 2015

(54) USER INTERFACE WITH VARIABLE SIZED ICONS

(75) Inventors: Peter Daniel Collins, Bracknell (GB); Nicholas J. N. Murphy, Surrey (GB)

(73) Assignee: ZIILABS INC., LTD., Hamilton (BM)

( * ) Notice: Subject to any disclaimer, the term of this patent is extended or adjusted under 35 U.S.C. 154(b) by 416 days.

(21) Appl. No.: 11/969,860

(22) Filed: Jan. 4, 2008

(65) Prior Publication Data

US 2008/0104544 A1   May 1, 2008

Related U.S. Application Data

(63) Continuation-in-part of application No. 11/567,689, filed on Dec. 6, 2006.

(60) Provisional application No. 60/597,534, filed on Dec. 7, 2005, provisional application No. 60/744,593, filed on Apr. 10, 2006.

(51) Int. Cl.
*G06F 3/048* (2013.01)
*G06F 17/30* (2006.01)

(52) U.S. Cl.
CPC .................. *G06F 17/30905* (2013.01)

(58) Field of Classification Search
CPC .... G06F 3/0482; G06F 3/0485; G06F 3/0486
USPC .......... 715/848, 849, 850, 851, 852
See application file for complete search history.

(56) References Cited

U.S. PATENT DOCUMENTS

| | | | | |
|---|---|---|---|---|
| 5,905,992 | A * | 5/1999 | Lucas et al. | 715/205 |
| 5,956,025 | A * | 9/1999 | Goulden et al. | 715/716 |
| 6,714,221 | B1 * | 3/2004 | Christie et al. | 715/784 |
| 7,600,192 | B1 * | 10/2009 | Hashimoto et al. | 715/802 |
| 2002/0140746 | A1 * | 10/2002 | Gargi | 345/853 |
| 2007/0150830 | A1 * | 6/2007 | Ording et al. | 715/784 |
| 2007/0260994 | A1 * | 11/2007 | Sciammarella et al. | 715/769 |

* cited by examiner

*Primary Examiner* — Thanh Vu
(74) *Attorney, Agent, or Firm* — Russell Swerdon; Desmund Gean

(57) ABSTRACT

A method of presenting content on the user interface display screen of a portable electronic device includes the presentation of a plurality of icons. The icons scale in size in accordance with a position of the respective icons along a curved path.

19 Claims, 6 Drawing Sheets

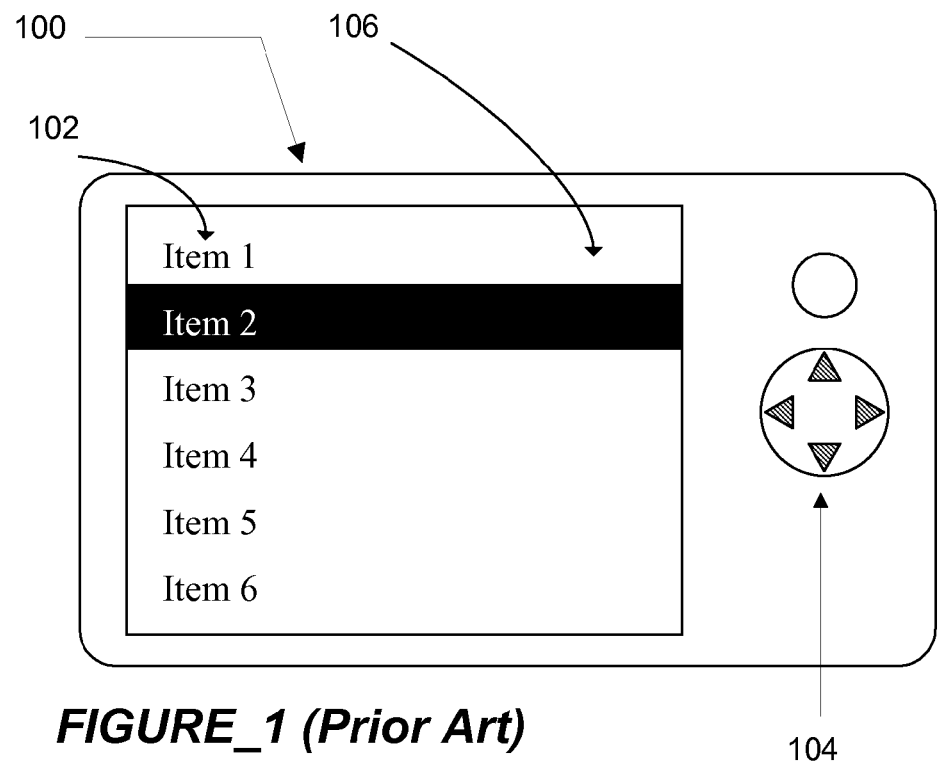
FIGURE_1 (Prior Art)
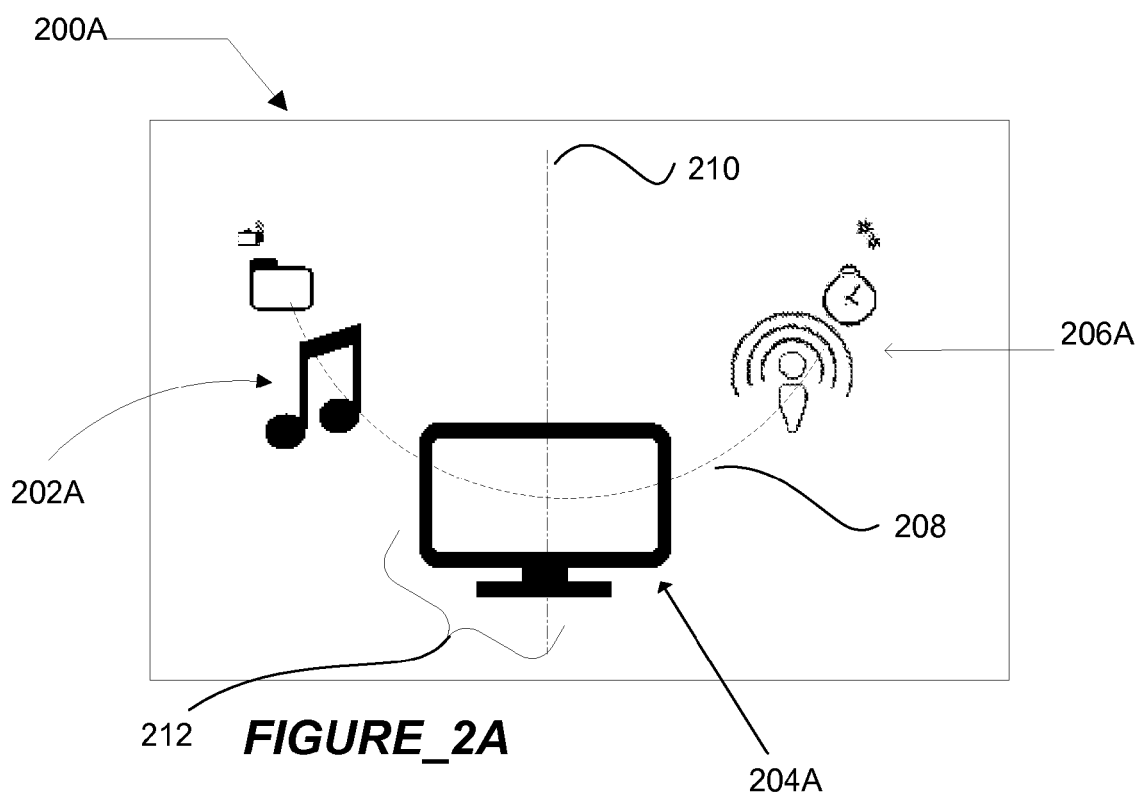
FIGURE_2A

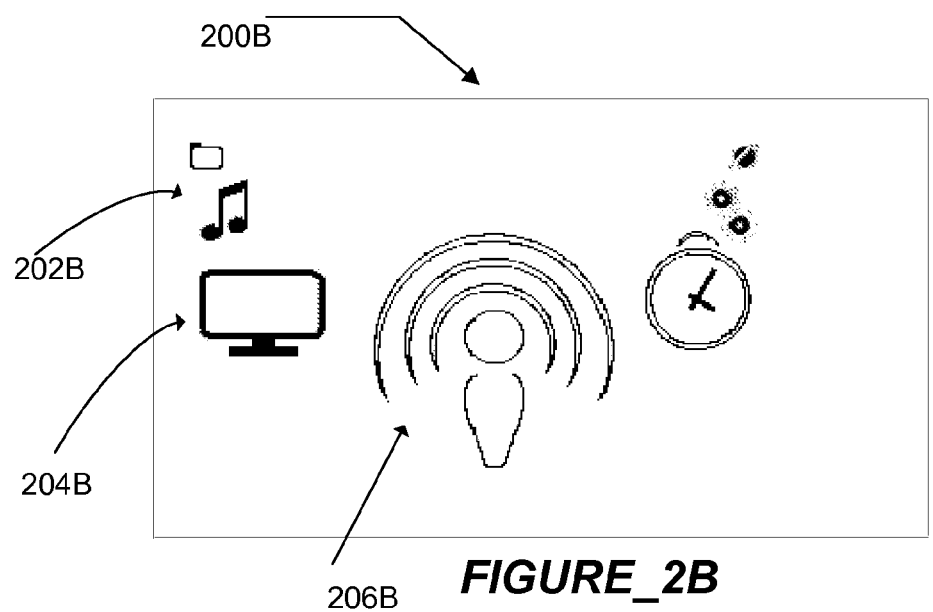
FIGURE_2B
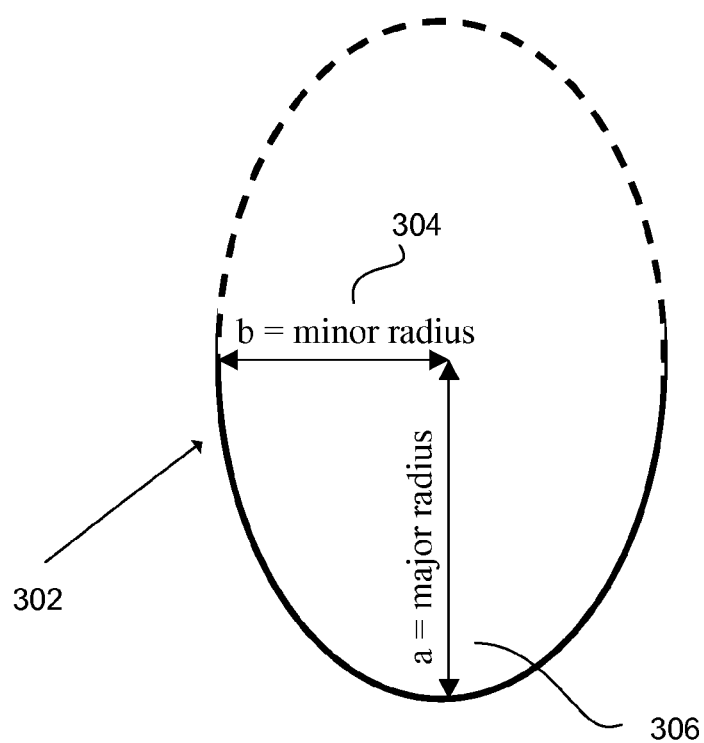
FIGURE_3

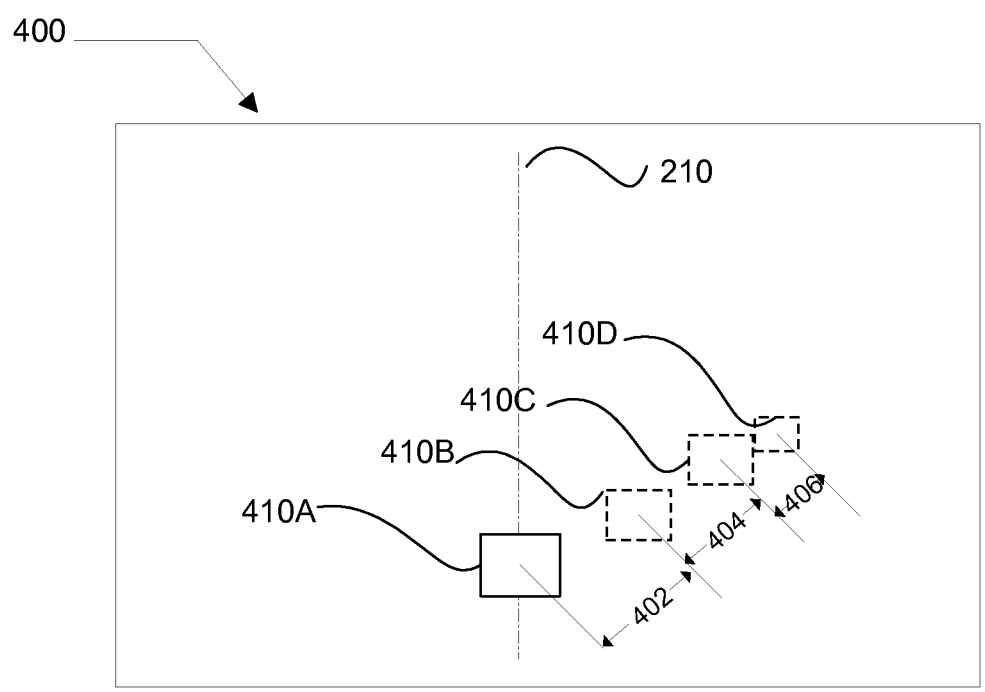
FIGURE_4

US 9,069,877 B2

USER INTERFACE WITH VARIABLE SIZED ICONS

RELATED APPLICATIONS

This application is a continuation-in-part of U.S. application Ser. No. 11/567,689 filed on Dec. 6, 2006 and entitled Methods for Manipulating Web Pages, which claims priority from and the benefit of U.S. Provisional Application No. 60/597,534, entitled Graphical User Interface for Portable Devices, filed on Dec. 7, 2005, and U.S. Provisional Application No. 60/744,593, entitled Methods for Manipulating Web Pages, filed on Apr. 10, 2006, the specifications of which are incorporated herein by reference in their entirety.

BACKGROUND OF THE INVENTION

1. Field of the Invention

The present invention relates to user interfaces. More particularly, the present invention relates to methods for presenting and accessing content on user interface display screens.

2. Description of the Related Art

As portable electronic devices become more sophisticated they may include many services including, but not limited to, playing music, playing videos, making and receiving telephone calls or sending and receiving emails. These services ideally are presented to the user in a form that is simple and efficient to use, while remaining visually attractive.

Displays for portable devices are often quite limited due to their emphasis on portability. Some portable digital entertainment devices may be used to carry music, photographs, video, electronic books, and other types of media. To be useful as a portable device they must be small, which in turn limits the size of screen they may use. The screen is often used to enable user interaction with the device, for example, to select the next item to view or hear. While the size of screen is limited the storage in the device continues to increase. A typical device may store thousands of songs, which makes finding a specific one difficult and time consuming.

A linear scrolling list is a common method of presenting options to a user. The list may be scrolled in either one dimension, most commonly vertically but on some devices horizontally, or in two dimensions. The items in the list may be represented by text, image, or a combination of both; the representation is referred to herein as the item's icon. The user typically scrolls the list 102 using buttons 104 on the device until the desired item is highlighted 106, then selects it by pressing another button. FIG. 1 shows such an example of a user interface 100.

As can be seen the linear list successfully provides a means for the user to interact with the device, but it can be slow to use, requiring several steps to scroll to and then separately select the desired item.

In some cases touch screens are deployed in electronic devices to reduce the number of steps taken to select an item from a list. A touch screen combines the display of information with the ability to select it by touching anywhere on the screen. The coordinate of the point touched is used to determine the icon selected, hence one item from a group may be selected without scrolling, provided it is visible on the screen.

It is useful to have as many icons visible on the screen as possible to reduce the need to scroll the list, but this must be balanced by the visibility of the icon. If the items are made small many of them will fit on the screen but they become more difficult to recognize and mistakes may be made. Making mistakes that must be corrected reduces the efficiency of the user interface.

A user interface must be simple for novices but efficient for experienced users. A linear list has to find a compromise between large icons that are easily identified by novices, and small icons that give direct access to more choices for experienced users. Similarly, users' eyesight will vary and some may have trouble seeing small icons.

As can be seen from the above, it is desirable to provide a user interface that is simple to use for a beginner, efficient for experienced users, and visually attractive.

SUMMARY OF THE INVENTION

To achieve the foregoing, the present invention provides a user interface with variable sized icons and a method for presenting content using variable sized icons.

In accordance with one embodiment, a user interface is provided on a touch sensitive screen. The display screen includes a plurality of icons representing items that may be selected. The plurality of icons are presented in a curved path and the sizes of the icons are a function of their respective positions on the curved path. The display screen user interface is configured such that the plurality of icons move along the curved path in one of two directions, the direction selected in response to a user input provided to the display screen.

In one embodiment, the user input is a pointing device in contact with the touch sensitive display screen. In another embodiment, the user interface is configured such that the plurality of icons continue to move and gradually come to a halt after said pointing device has been removed from said screen. In yet another embodiment, any of said plurality of icons are selectable by touch. In still another embodiment, the curved path visible on the display screen is a portion of an ellipse.

In accordance with another embodiment, a user interface is provided on a touch sensitive screen. The display screen includes a plurality of icons representing items that may be selected. The plurality of icons are presented in a curved path and the sizes of the icons are a function of their respective positions on the curved path. The display screen user interface is configured such that the plurality of icons move along the curved path in two directions, the particular direction of the two selected in response to a user input provided to the display screen. The display screen user interface is configured such that the area of said icons approaches or becomes zero at the ends of the curved path. In a further embodiment, the resolution of said at least some of the plurality of icons are changed to correspond to their changed size on the display screen.

In accordance with another embodiment, a method of selecting content on a display screen of a portable electronic device or alternatively a portable media player is provided. A plurality of icons positioned along a curved path in the display screen represent a plurality of content items. The respective sizes of the icons are a function of the location of the icons relative to a predetermined position. The user interface is configured to cause the icons to travel along the curved path in response to a user input. In one embodiment, the display screen is a touch screen and the icons are selectable by touching the display screen.

These and other features and advantages of the present invention are described below with reference to the drawings.

BRIEF DESCRIPTION OF THE DRAWINGS

FIG. 1 is a diagram illustrating a known user interface design.

FIG. 2A is a diagram illustrating a user interface display screen in accordance with one embodiment of the present invention.

FIG. 2B is a diagram illustrating the user interface display screen of FIG. 2A transitioning in response to user input in accordance with one embodiment of the present invention.

FIG. 3 is a diagram illustrating control parameters for a user interface display screen in accordance with one embodiment of the present invention.

FIG. 4 is a diagram illustrating a presentation of icons in a user interface display screen in accordance with one embodiment of the present invention.

FIG. 74 is a diagram illustrating an overhead view of a viewer, display screen, and list having facets in accordance with one embodiment of the present invention.

DETAILED DESCRIPTION OF PREFERRED EMBODIMENTS

Figure 5:
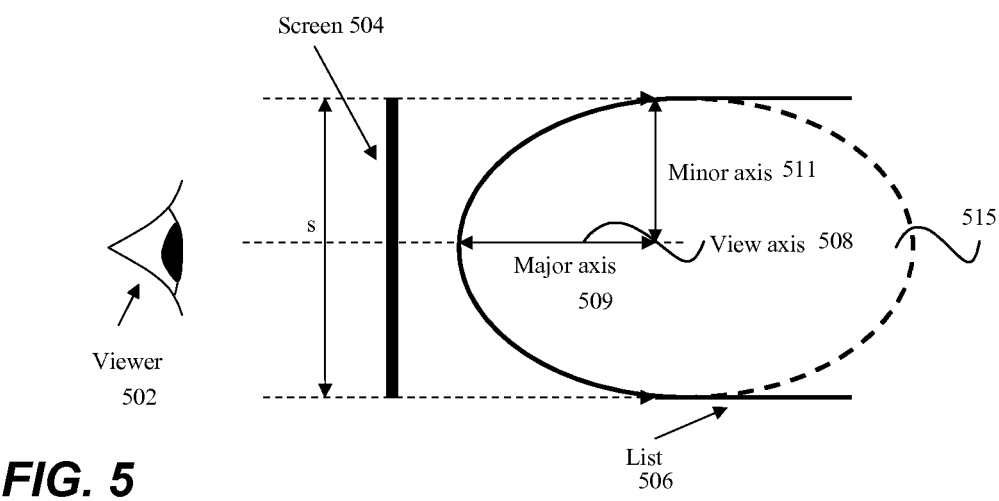
FIG. 5 is a diagram illustrating an overhead view of a viewer, display screen, and elliptical list in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

Embodiments of the present invention provide methods of presenting information to a user of a portable electronic device. In preferred embodiments, the display screen of the user interface presents information through text, images or both, collectively referred to as icons, that scale in size to allow many icons or other representations of content to be on the screen without sacrificing visibility.

FIGS. 2A and 2B provide illustrations of the user interface in accordance with embodiments of the present invention. In FIG. 2A, the display 200A representation of the user interface includes presentation of a plurality of icons (such as including icons 202A, 204A, 206A) along a curved path 208. For clarity in illustration the curved path 208 location is assisted by the shown curved dashed line but it should be understood that it is not intended to be limiting. That is, the breadth of the invention includes presentation of icons along any curved path, whether the path location is visibly highlighted by solid, broken, or other lines or markers or whether the curved path location is only discerned from the presence of the corresponding plurality of icons or motion of the icons without the assistance of lines or other markers.

In one embodiment, the user causes the list of icons to rotate (along the curved path) by sliding a finger across the touch screen left to right or right to left. As the list rotates it brings icons to the bottom of the screen; icons that are near the bottom are larger than those that are higher up. This feature is intended to convey to the user that the larger icons appearing at the bottom of the screen are closer, i.e., the curved path, presented on a two-dimensional display screen, lies in three dimensions with the curved path extending into the screen. The larger icons such as the larger video icon 204A (shown in FIG. 2A) are intended to portray the foreground while the smaller icons are intended to portray the background.

Hence, the user input causes the icons positioned along the curved path 208 to appear to move, and preferably, to change size with their movement. For example, as video icon transitions from its appearance 204A in screen 200A (FIG. 2A) to its appearance 204B in the display screen of FIG. 2B, it moves out of the foreground towards the background. Accordingly, icon 204B is smaller than icon 204A. A similar effect occurs to the music icon 202A, 202B where it also becomes smaller in response to the movement of icons along the curved path 208. Conversely, the user settings icon (respectively icon 206A and 206B in FIGS. 2A, 2B) grows in size as it moves from the background to the foreground along the curved path 208.

It should be understood that in this embodiment, the center bottom location is chosen as the predetermined focus point of the curved path but this is not intended to be limiting as to the scope of the invention. The predetermined position could as easily be chosen anywhere else on the display screen including but not limited to the top, or one or other of the sides.

Varying the size of the icons allows more to fit on the screen while keeping those near the bottom clearly visible. A novice can easily see the large icons while the more experienced user can select the smaller icons as familiarity with them grows. Any icon visible on the screen may be selected by touching it with a finger or other pointing device; selection is not limited to the largest icon. In accordance with another embodiment, selection of icons from the curved path may be limited to icons corresponding to a foreground of the image of the curved path. For example, the user interface may be configured such that only icons exceeding a selected threshold of size may be user selectable. This provides an advantage that user selection errors arising from touch sensitive selections of small icons in background areas of the curved path presentation can be minimized.

In the preferred embodiment the list stops moving when the last icon is at the bottom of the screen on the central axis 210 (i.e., at the predetermined focal position); an attempt to move past this points results in the icon moving as required, but bouncing back to centre-bottom position 212. In an alternative embodiment the icons are allowed to continue moving and having disappeared from one side of the screen they may re-appear on the other, hence representing a loop of icons.

The path the icons follow is shown as an ellipse because it makes good use of the space on the screen and is aesthetically pleasing. However, the scope of the invention is not so limited. For example, the icons may follow any type of curved path. For a nonlimiting example, the curved path may comprise any path that includes curves including but not limited to a curved path that is circular, serpentine, or even a combination path that includes both curved and straight line segments In the preferred embodiment an icon moves along the ellipse by a distance that varies in proportion to its size. That is, generally, in response to user input such as the user's finger sliding across the screen (or, for example, other translational movement by a pointing device) the movement of the plurality of icons along the curved path includes small icons moving small distances and larger icons moving larger distances along the path.

The circumference or perimeter of an ellipse is difficult to calculate precisely but a useful approximation is:

$$p \approx \pi \sqrt{\{2(a^2+b^2)-(a-b)^2/2\}} \quad \text{(eqn. 001)}$$

Where a and b are the major axis 306 and minor axis 304 as shown for the ellipse 302 in FIG. 3. In one embodiment, a table is constructed that holds the screen xy position for a series of points along the curve to avoid calculating the ellipse during display. Piecewise approximation methods are used to estimate positions between those in the table. Of course, providing control of the size and/or position of the icons may be implemented by any other suitable method known to those of skill in the relevant arts consistent with the guidance provided by this disclosure.

In accordance with another embodiment, if the pointer is removed from the screen while still moving, the icons continue to move as though they have mass. The speed of movement gradually reduces as though they are slowed by friction. The following equation shows the how the speed of the icons may be calculated in one embodiment:

$$s_{n+1} = 1/((1/s_n)-f)$$

Where $s_n$ is the current speed, $s_{n+1}$ is the speed being calculated and f is a constant representing friction. Alternative embodiments may use other equations to calculate the speed. FIG. 4 is a diagram illustrating inertial presentation of icons in a user interface display screen in accordance with one embodiment of the present invention.

For illustration purposes, the time sequenced positions of an icon are displayed in accordance with this embodiment. For example, at the time ($t_0$) that the user's finger is lifted from the screen, the icon location is at position 410A. Sequential positions of the icon are shown at times $t_1$, $t_2$, and $t_3$. That is, at time $t_1$, the icon 410 is positioned at location 410B, whereas at time $t_2$, the icon is positioned at location 410C, and at time $t_3$ at location 410D. The time interval from time to $t_1$ is equal to the time interval between other sequential time points. That is, the interval from $t_1$ to $t_2$ is equal to the interval from $t_0$ to $t_1$, etc. As shown, the apparent distance traveled over these equal time intervals progressively decreases. For example, the apparent first distance traveled on the display screen over the first interval corresponds to distance 402, over the second interval to distance 404, and over the third interval to distance 406. These distances progressively decrease, in one embodiment corresponding to a constant deceleration. In accordance with another embodiment, the deceleration is selected such that the icons decelerate at a first deceleration rate and after a preselected time interval (for a nonlimiting example, 0.20 seconds) the deceleration rate increases to bring the icons quickly to rest.

In accordance with another embodiment, when the last icon reaches the bottom of the screen the direction reverses and the icons bounce back. At the bounce the speed of movement is reduced such that it is not possible for list to move all the way to the other end and bounce a second time. It is desirable for the icons to come to rest in positions that are neatly aligned, specifically with the largest icon on the central axis.

In general, the display screen user interface is configured such that as an icon moves away from the bottom of the screen it becomes smaller. The size is calculated such that an icon has maximum size at the bottom of the screen (or other predetermined focal point) and zero size at the endpoints of the curved path. Between these points the size may be linearly interpolated according to distance along the curve, or calculated with a non-linear function. As the icons move along the curve they eventually reach the end and disappear. Similarly, icons at the other end will appear. Hence although there is a limit to the number of icons that may be viewed simultaneously, there is no limit to the number that may be brought into view. FIGS. 2A and 2B show a clockwise rotation with an icon disappearing from the left hand side and a new icon appearing on the right.

A single icon may be scaled to the required size but this may exhibit aliasing artifacts caused by resampling the icon image. The aliasing may be reduced by filtering, or by switching to smaller versions of the icon as necessary. In a preferred embodiment a number of selectable icons are stored in memory, each smaller than the last. Preferably, steps between each discrete icon may be constructed by a filtered combination of one too small and one too large.

The embodiments above have all described horizontal scrolling of a list of icons with the icons at their largest at the bottom of the screen. Those skilled in the art will recognize that the same techniques may be applied to curves in any orientation, and that the lists may contain, without limitation, text including names, images including photographs, animated sequences of images or in general, data files.

In general, other embodiments of the present invention include adjustments to the presentation of the ellipse or other curved path used in the presentation of the plurality of icons. These are illustrated in FIGS. 5-10 as described below.

Figure 6:
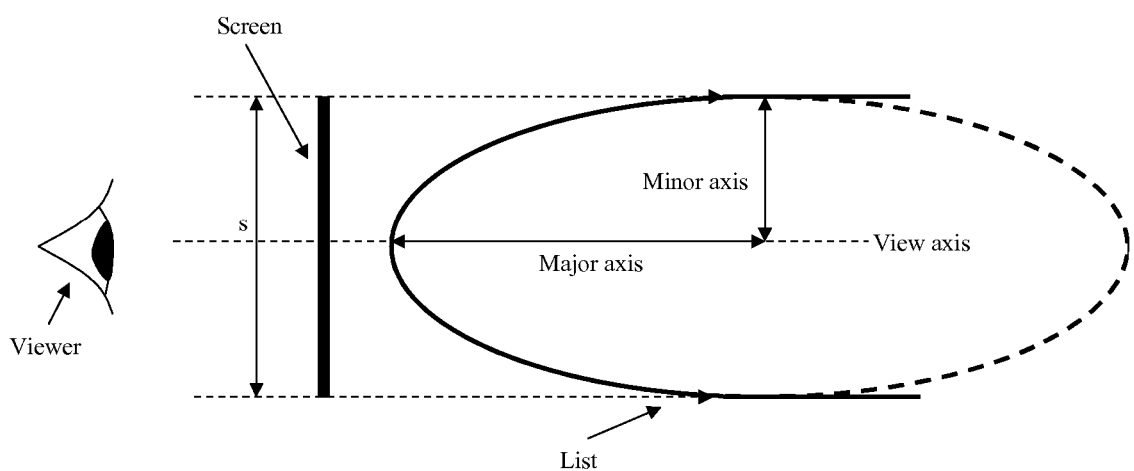
FIG. 6 is a diagram illustrating an overhead view of a viewer, display screen, and elliptical list with modified eccentricity in accordance with one embodiment of the present invention.

FIG. 52 illustrates an overhead view of a representation of the viewer 502, screen 504, and elliptical list 506. The viewer 5202 looks along the view axis 508 at the screen 504 that displays a section of the plurality or list of icons. The curved path is generated from the list 506 bent around an ellipse that increases the size of its perimeter relative to a circle, and therefore the number of items visible. If both the major and minor axes (509, 511) are the same length the shape is circular. As the major axis 509 becomes longer than the minor axis 511 the eccentricity of the ellipse 515 increases; as the eccentricity increases the perimeter of the ellipse 515 visible on the screen 504 increases, so the number of visible items also increases (see FIG. 6.) FIG. 6 illustrates in particular that as the eccentricity of the ellipse increases, its perimeter also increases making more of the list visible.

The circumference or perimeter of an ellipse is difficult to calculate precisely but a useful approximation is:

$$p \approx \pi \sqrt{\{2(a^2+b^2)-(a-b)^2/2\}}$$

where p is the perimeter, a is the major axis, and b is the minor axis. Therefore the increase in apparent screen space given as a ratio of apparent screen height (or width) to actual screen height (or width) is:

$$\frac{\text{Screen height (or width) ratio} \approx \pi}{\sqrt{\{2(a^2+(s/2)^2)-(a-(s/2))^2/2\}/2}}$$

where s is the screen height. Where for a circle the ratio is 1.57, for an ellipse with the major axis double the minor axis the ratio is 2.42, meaning that 2.42 times as many items may be displayed on this shape of ellipse as a on a flat representation. But despite the increase in the number of items visible, the size of the center item is largely unchanged and so easily identified. As items are placed further from the viewing axis they suffer increasing distortion and are increasingly difficult to identify.

Figure 7:
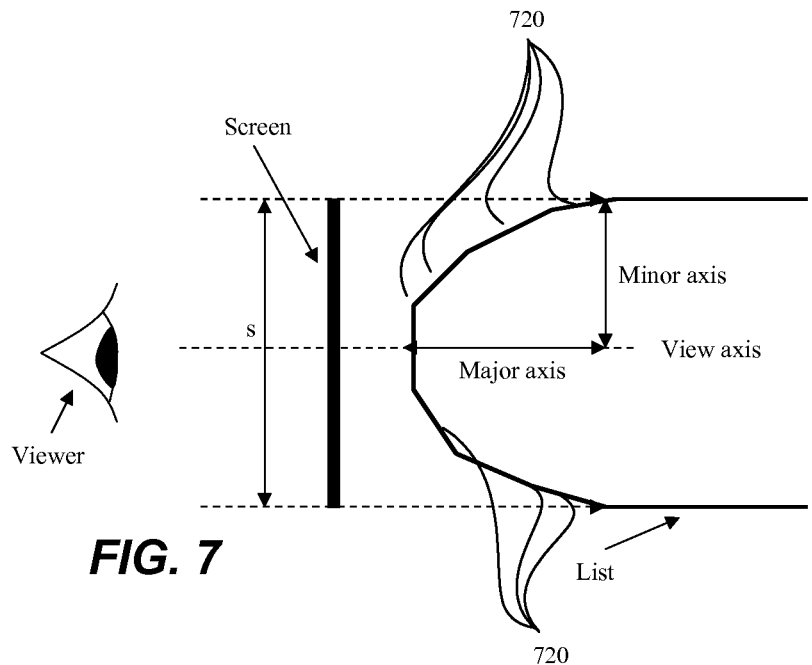
Figure 8:
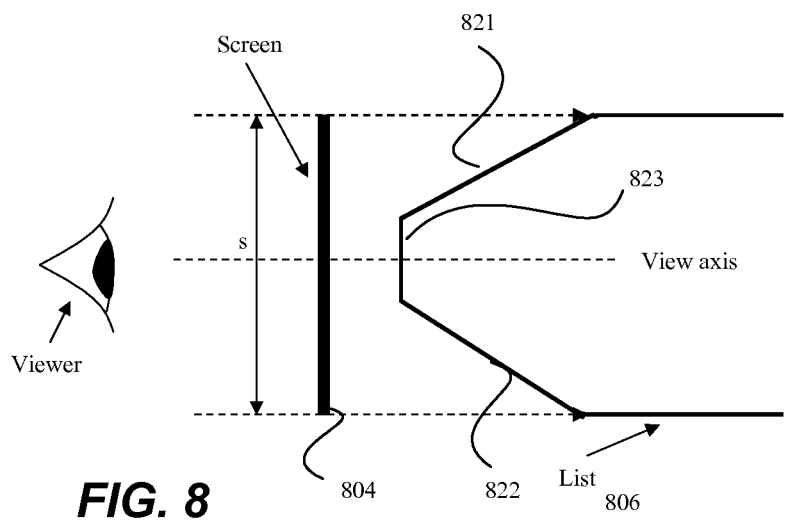
FIG. 8 is a diagram illustrating an overhead view of a viewer, display screen, and list having three facets in accordance with one embodiment of the present invention.

In another embodiment the smooth curve of the circle or ellipse may be replaced by facets representing a piecewise approximation of the curve such as the one shown in FIG. 7. As the facets 720 become larger the curve ceases to appear smooth, but the same benefits of apparently increased screen space remain. In the extreme the curve may be reduced to just three facets, shown in FIG. 8, where a warping effect may be applied to the left and right faces (821, 822) making the items smaller towards the respective left and right sides of the screen 804, while the items on the center face 823 remain approximately the correct size. In summary, FIG. 7 illustrates that the curved surface may be represented by facets instead of a continuous curve. FIG. 8 illustrates a similar effect that may be reproduced on only three facets.

Those skilled in the art will recognize that the diameter of curvature does not need to match the height (or width) of the screen, and that a flatter curvature will be seen if the diameter is greater than the screen height (or width) with less distortion at the edges. In other embodiments curves other than an ellipse are used as the basis for warping the image.

In a preferred embodiment as described and illustrated in FIGS. 5-10, the items displayed at the center of the screen have minimum distortion to keep them most clearly visible. In another embodiment minimum distortion may be placed off the center line in order to bias the distortion in one direction or another.

Figure 9:
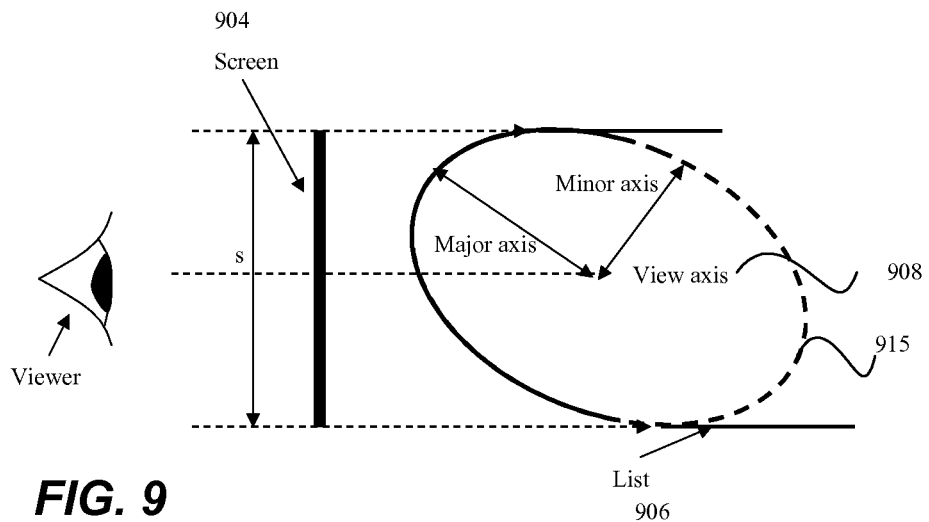
FIG. 9 is a diagram illustrating an overhead view of a viewer, display screen, and rotated elliptical list in accordance with one embodiment of the present invention.

FIG. 9 illustrates that the ellipse 915 may be rotated away from the view axis 908. FIG. 9 shows an ellipse 915 rotated to position the minimum distortion towards the left of the display screen 904. If the list 906 is being scrolled clockwise, rotating the ellipse 915 towards the left as shown maximizes the number of items visible to the right side, which can give advance warning of an approaching target item. The rotation of the curve may be fixed by the design of the user interface, or may be dynamic, rotating left or right according to the direction and speed of the scroll. In a further embodiment, the degree of curvature of the list 906 may be linked to the speed of scrolling. For example, a faster scroll may cause the curvature to increase to make more items visible.

Figure 10:
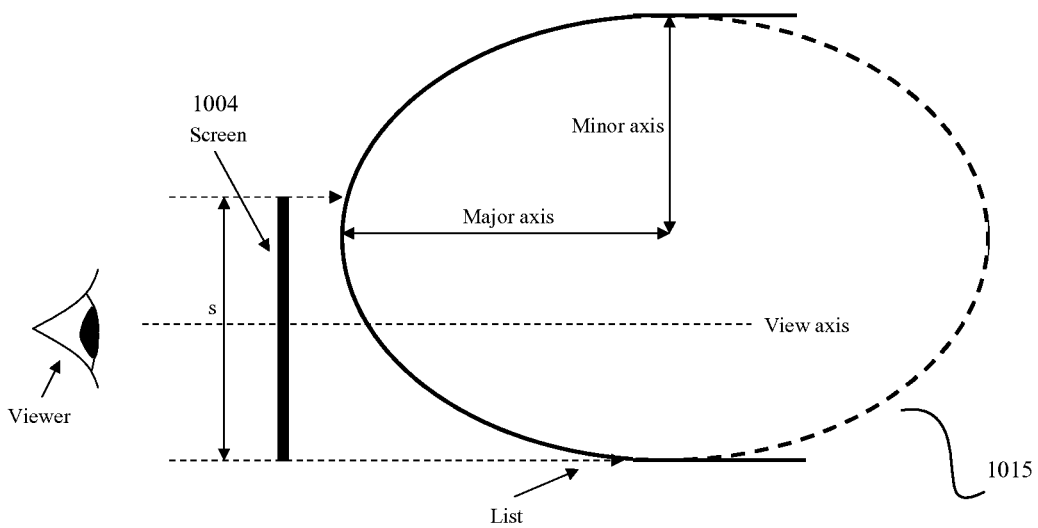
FIG. 10 is a diagram illustrating an overhead view of a viewer, display screen, and elliptical list increased in size in accordance with one embodiment of the present invention.

In another embodiment the diameter of the curve may be greater than the size of the screen, but the center of the curve is shifted away from the center of the screen. A large ellipse may be offset from the view axis to give more warning of items being scrolled into view. FIG. 10 shows a large ellipse 1015 that has been shifted so that the undistorted region is near the left side of the screen 1004. This arrangement may be appropriate for lists that are scrolled to the left on the screen as it gives maximum visibility to those items appearing at the right of the screen. The offset of the curve from the center may be affected by the direction and speed of scrolling.

The embodiments above have all described horizontal scrolling of a list of items, for example a plurality of icons. Those skilled in the art will recognize that the same techniques may be applied to vertical scrolling of lists, and that the lists may contain, without limitation, links such as hypertext links, text including names, images including photographs, and control menu options.

It is to be appreciated that the scope of the invention is to include other apparatus and techniques for displaying items within a listing. For illustration purposes the listing of items have generally described a listing of text items. The scope of the invention is intended to extend to any content associated with the text items, including but not limited to audio files, video files, other media files, and control items such as menu options accessible through the user interface. In particular, the text items relating to audio files can include titles, artists, genres, albums, or any other metadata used to navigate to tracks, such as particularly but not exclusively those content items accessed in a portable media player, such as an audio MP3 player having a plurality of tracks stored or accessible from the player. Further, the scope is intended to extend to at least the same content items represented in the listing by icons or other non textual identification means.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A user interface configured for selection of media content items, the user interface comprising:
    a touch sensitive display screen having visible a plurality of icons representing items that may be selected by a user, wherein said icons are distributed along a curved path and have corresponding sizes that depends upon their positions on the curved path; and
    a user input sensing mechanism configured to cause said icons to move along said curved path in at least one of a forward and reverse direction in response to a sensed user input direction, wherein each of the plurality of icons moves to an adjacent position along said curved path by a distance that varies in proportion to its size such that small sized icons move small distances and larger sized icons move larger distances.

2. The user interface as recited in claim 1 wherein the sensed user input direction is provided by a pointing device in contact with the display screen.

3. The user interface as recited in claim 2 wherein the pointing device is a finger.

4. The user interface as recited in claim 2 wherein the user interface is further configured to cause said icons to continue to move and gradually come to a halt after said pointing device has been removed from said screen.

5. The user interface as recited in claim 1 wherein the plurality of icons are configured to change resolution to correspond to their changed size along the curved path.

6. The user interface as recited in claim 1 wherein the curved path is an ellipse.

7. The user interface as recited in claim 1 wherein the user interface is configured such that the icons have an area approaching zero as the respective icon position approaches an endpoint of the curved path on the display screen.

8. The user interface as recited in claim 1, wherein only icons including and not exceeding a selected threshold of size are user non-selectable.

9. The user interface as recited in claim 1, wherein the plurality of icons move at equal time intervals between sequential positions along said curved path.

10. The user interface as recited in claim 1, wherein each of the plurality of icons is parallel to said curved path.

11. The user interface as recited in claim 1, wherein a degree of curvature of the curved path is dynamically adjusted to increase when the plurality of icons' movement increases in speed along said curved path.

12. A method of selecting content on a display screen of a portable media player, the method comprising:
representing a plurality of content items by a plurality of icons having corresponding sizes positioned along a curved path in the display screen; and
varying the respective sizes of the icons as a function of the location of the icons relative to a predetermined position; wherein the display screen is configured to cause the icons to travel along the curved path in response to a user input, and wherein each of the plurality of icons travels to the adjacent predetermined position along the curved path by a distance that varies in proportion to its size such that small sized icons move small distances and larger sized icons move larger distances.

13. The method as recited in claim 12 wherein the display screen is a touch screen and the icons are selectable by touching the display screen.

14. The method as recited in claim 13 wherein the predetermined position is a point located between the endpoints of the curved path but not at the endpoints and wherein the icon at the predetermined position is the largest icon of the plurality.

15. The method as recited in claim 12 wherein the curved path simulates part of an ellipse.

16. The method as recited in claim 12 wherein the plurality of icons are caused to move along a curved path that simulates one of a circular or elliptical path in a three dimensional view and wherein the predetermined position simulates the location of the nearest icon in the three dimensional view.

17. The method as recited in claim 12 wherein the travel (movement) of the icons slows down gradually in response to removal of the user input.

18. The method as recited in claim 12 wherein the travel of the plurality of icons exhibits a reversal of direction automatically when the end of the list of content items is reached.

19. A computer program product for selecting content on a display screen of a portable media player, the computer program product embodied in a non-transitory computer readable medium and comprising computer executable instructions for:
representing a plurality of content items by a plurality of icons having corresponding sizes positioned along a curved path in the display screen; and
varying the respective sizes of the icons as a function of the location of the icons relative to a predetermined position; wherein the display screen is configured to cause the icons to travel along the curved path in response to a user input, and wherein each of the plurality of icons travels to the adjacent predetermined position along the curved path by a distance that varies in proportion to its size such that small sized icons move small distances and larger sized icons move larger distances.

* * * * *